United States Patent
Ohno et al.

(10) Patent No.: US 11,560,155 B2
(45) Date of Patent: Jan. 24, 2023

(54) INFORMATION PROCESSING DEVICE, INFORMATION PROCESSING METHOD, AND SYSTEM

(71) Applicant: TOYOTA JIDOSHA KABUSHIKI KAISHA, Toyota (JP)

(72) Inventors: Mitsuyoshi Ohno, Miyoshi (JP); Daiki Kubo, Toyota (JP); Yosuke Nozaki, Toyota (JP); Tsukasa Nakanishi, Nagoya (JP); Hironori Aoyama, Toyota (JP); Seiji Yogo, Nagoya (JP); Tae Sugimura, Miyoshi (JP); Yasuhiro Kobatake, Nagoya (JP); Takeshi Yamada, Anjo (JP); Ryo Sato, Nisshin (JP); Sayaka Ninoyu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 16/953,954

(22) Filed: Nov. 20, 2020

(65) Prior Publication Data
US 2021/0163044 A1    Jun. 3, 2021

(30) Foreign Application Priority Data

Nov. 28, 2019   (JP) .............................. JP2019-215708

(51) Int. Cl.
*B60W 60/00* (2020.01)
*G01C 21/36* (2006.01)
*G08G 1/123* (2006.01)

(52) U.S. Cl.
CPC ... *B60W 60/00133* (2020.02); *G01C 21/3605* (2013.01); *G08G 1/123* (2013.01)

(58) Field of Classification Search
CPC .......... B60W 60/00133; B60W 50/16; B60W 2050/143; G01C 21/3605; G01C 21/3652;
(Continued)

(56) References Cited

U.S. PATENT DOCUMENTS

2003/0039366 A1* 2/2003 Eid .................. H04S 5/005
                                              381/27
2018/0160819 A1* 6/2018 Rutledge .............. A47C 21/003
(Continued)

FOREIGN PATENT DOCUMENTS

| JP | 60-015064 U | 2/1985 |
|----|-------------|--------|
| JP | 2015-158469 A | 9/2015 |
| JP | 2019-105576 A | 6/2019 |

*Primary Examiner* — Abby Y Lin
*Assistant Examiner* — Danielle Marie Jackson
(74) *Attorney, Agent, or Firm* — Sughrue Mion, PLLC

(57) ABSTRACT

An information processing device includes a control unit configured to: acquire information on a destination of a user who uses a resting unit including equipment on which the user is able to sleep, information on an arrival time at the destination, and information on a place in which the user uses the resting unit; transmit a command to a traveling unit configured to be coupled to the resting unit and carry the resting unit such that the traveling unit is coupled to the resting unit and arrives at the destination at the arrival time; and transmit a command to a stimulation device configured to stimulate the user who is using the resting unit such that the stimulation device is activated before the traveling unit is coupled to the resting unit or before the traveling unit departs for the destination after being coupled to the resting unit.

17 Claims, 8 Drawing Sheets

(58) Field of Classification Search
CPC ............... G01C 21/3697; G08G 1/123; G08G 1/096816; G08G 1/096725; H04L 67/12; H04L 67/52; G08B 7/06; G08B 21/06
See application file for complete search history.

(56) References Cited

U.S. PATENT DOCUMENTS

| | | | |
|---|---|---|---|
| 2018/0170231 A1* | 6/2018 | Song | B60W 30/182 |
| 2019/0258253 A1* | 8/2019 | Tremblay | G05D 1/0088 |
| 2019/0389359 A1* | 12/2019 | Liburdi | G05D 1/0088 |
| 2020/0290647 A1* | 9/2020 | Anderson | G01C 21/3691 |
| 2020/0383580 A1* | 12/2020 | Shouldice | B60W 50/14 |

* cited by examiner

| USER ID | PREDETERMINED PLACE | DESTINATION | DESIRED ARRIVAL TIME | RESTING STATE |
|---|---|---|---|---|
| U001 | L10 | L11 | T10 | REQUESTED |
| U002 | L20 | L21 | T20 | ARRANGED |
| U003 | L30 | L31 | T30 | ARRANGED |
| U004 | L40 | L41 | T40 | FINISHED |
| ... | ... | ... | ... | ... |

| RESTING UNIT ID | POSITION INFORMATION | OPERATING STATE | USER ID |
|---|---|---|---|
| E01 | F01 | STAND-BY | |
| E02 | F02 | OPERATING | U002 |
| E03 | F03 | OPERATING | U003 |
| E04 | F04 | UNDER MAINTENANCE | |
| ... | ... | ... | ... |

FIG. 6
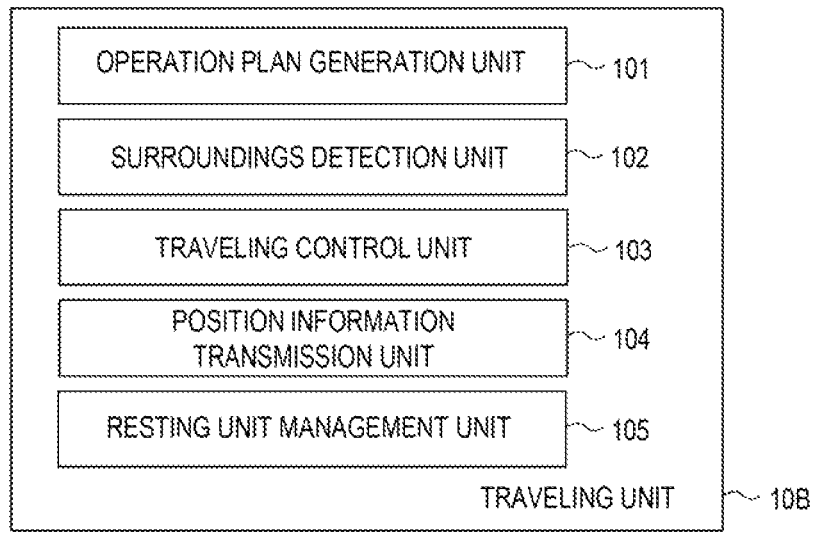
FIG. 7
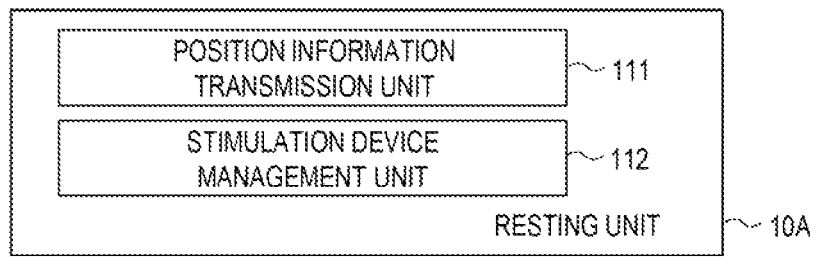
FIG. 8
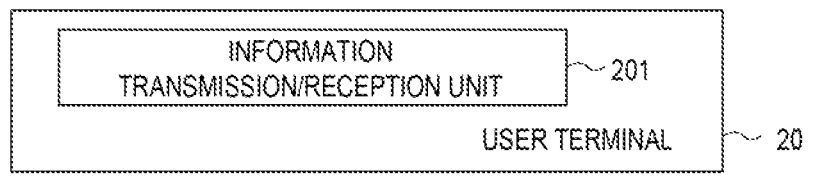
FIG. 9

INFORMATION PROCESSING DEVICE, INFORMATION PROCESSING METHOD, AND SYSTEM

CROSS-REFERENCE TO RELATED APPLICATION

This application claims priority to Japanese Patent Application No. 2019-215708 filed on Nov. 28, 2019, incorporated herein by reference in its entirety.

BACKGROUND

1. Technical Field

The disclosure relates to an information processing device, an information processing method, and a system.

2. Description of Related Art

A technology is well-known in which a vehicle autonomously drives such that a user arrives at a destination at a time when he/she desires (see, for example, Japanese Unexamined Patent Application Publication No. 2015-158469). Further, another technology is well-known in which, when at least one of occupants of a vehicle is in a sleeping state during autonomous driving, a traveling plan is changed to a traveling plan with the least sleep-hindering disturbances, selected from among a plurality of traveling plans having different driving routes (see, for example, Japanese Unexamined Patent Application Publication No. 2019-105576).

SUMMARY

The present disclosure prevents a sleeping user from being awakened by stimulation that the sleeping user receives when a vehicle departs.

A first aspect of the present disclosure is an information processing device that includes a control unit configured to acquire information on a destination of a user who uses a resting unit including equipment on which the user can sleep, information on an arrival time at the destination, and information on a place in which the user uses the resting unit, transmit a command to a traveling unit configured to be coupled to the resting unit and carry the resting unit such that the traveling unit is coupled to the resting unit and arrives at the destination at the arrival time, and transmit a command to a stimulation device configured to stimulate the user who is using the resting unit such that the stimulation device is activated before the traveling unit is coupled to the resting unit or before the traveling unit departs for the destination after being coupled to the resting unit. The traveling unit is configured to be movable even while not coupled to the resting unit.

A second aspect of the present disclosure is an information processing method that includes a step of acquiring, by a computer, information on a destination of a user who uses a resting unit including equipment on which the user can sleep, information on an arrival time at the destination, and information on a place in which the user uses the resting unit, a step of transmitting, by the computer, a command to a traveling unit configured to be coupled to the resting unit and carry the resting unit such that the traveling unit is coupled to the resting unit and arrives at the destination at the arrival time, and a step of transmitting, by the computer, a command to a stimulation device configured to stimulate the user who is using the resting unit such that the stimulation device is activated before the traveling unit is coupled to the resting unit or before the traveling unit departs for the destination after being coupled to the resting unit. The traveling unit is configured to be movable even while not coupled to the resting unit.

A third aspect of the present disclosure is a system that includes a resting unit including equipment on which a user can sleep, a traveling unit configured to be coupled to the resting unit and carry the resting unit, and to be movable even while not coupled to the resting unit, a terminal owned by the user, and a control unit. The control unit is configured to acquire, from the resting unit or the terminal, information on a destination of the user who uses the resting unit, information on an arrival time at the destination, and information on a place in which the user uses the resting unit, transmit a command to the traveling unit such that the traveling unit is coupled to the resting unit and arrives at the destination at the arrival time, and transmit a command to a stimulation device configured to stimulate the user who is using the resting unit such that the stimulation device is activated before the traveling unit is coupled to the resting unit or before the traveling unit departs for the destination after being coupled to the resting unit.

Further, another aspect of the present disclosure is a program that causes a computer to execute the above information processing method, or a non-transitory storage medium storing the program.

With each aspect of the present disclosure, it is possible to prevent a sleeping user from being awakened by stimulation that the sleeping user receives when a vehicle departs.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a table exemplifying a composition of traveling unit information;

FIG. 7 is a diagram illustrating an example of a functional configuration of the traveling unit;

FIG. 8 is a diagram illustrating an example of a functional configuration of the resting unit;

FIG. 9 is a diagram illustrating an example of a functional configuration of the user terminal;

DETAILED DESCRIPTION OF EMBODIMENTS

Figure 1:
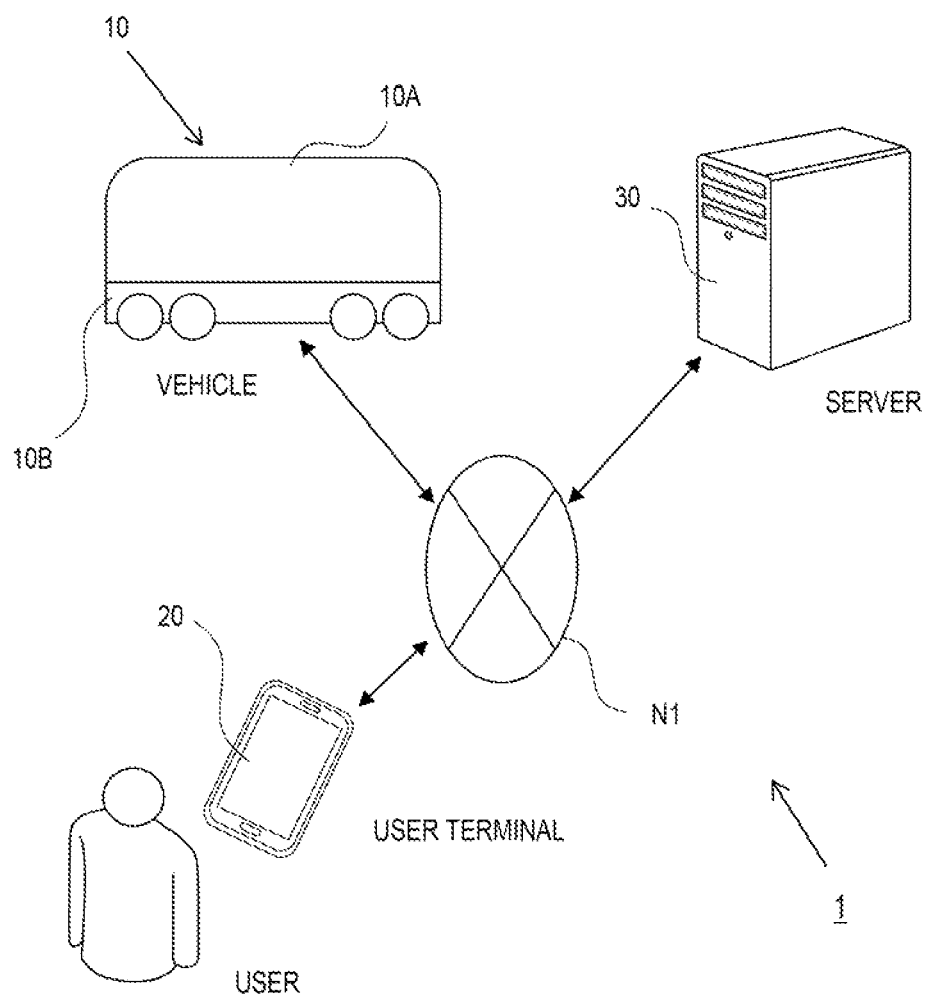
FIG. 1 is a diagram illustrating a schematic configuration of an autonomous driving system according to an embodiment.

A traveling unit managed by an information processing device, which is a first aspect of the present disclosure, may be, for example, a vehicle that autonomously travels based on an operation command. The traveling unit can be coupled to a resting unit and carry the resting unit while coupled thereto. The resting unit includes equipment on which a user can take a rest. For example, the resting unit includes a bed on which the user can sleep. The traveling unit can travel even while not coupled to the resting unit. Therefore, after arranging the resting unit in a place, the traveling unit can move away from that place.

The control unit acquires information on a destination of the user who uses the resting unit, information on an arrival time at the destination, and information on a place in which the user uses the resting unit. The user's destination is the destination of the traveling unit when the traveling unit carries the resting unit which the user is aboard. The user's destination may be, for example, a place input by the user via a terminal provided in the resting unit or a terminal owned by the user. The arrival time at the destination may be, for example, a time desired by the user. The arrival time at the destination may be, for example, a time input by the user via the terminal provided in the resting unit or the terminal owned by the user. Examples of the information on the place in which the user uses the resting unit may include information on a place in which the user boards the resting unit, information on a place of the resting unit which the user is aboard, information on a place in which the resting unit is arranged in advance, information on a place in which the user desires to sleep, and information on a place designated by the user.

The control unit transmits a command to the traveling unit such that the traveling unit is coupled to the resting unit which the user is aboard and arrives at the destination at the arrival time. When the traveling unit travels according to the command, the user can move to the destination while taking a rest in the resting unit, and arrive at the destination at the desired time. Therefore, the user can move while sleeping.

In addition, the control unit transmits a command to a stimulation device that stimulates the user aboard the resting unit such that the stimulation device is activated before the traveling unit is coupled to the resting unit or before the traveling unit departs for the destination after being coupled to the resting unit. The stimulation device provides the user with stimulation by, for example, generating sound or vibration. The sound and vibration are similar to sound or vibration generated when the traveling unit is coupled to the resting unit, or sound or vibration generated after the resting unit departs. Such sound and vibration may be set according to data stored in advance.

The stimulation device provides stimulation to the user before the user is actually stimulated by sound, the vibration, or the like, generated when the traveling unit is coupled to the resting unit, or before the user is actually stimulated by the sound, the vibration, or the like, generated after the resting unit departs for the destination. As such, the user can become accustomed in advance to the stimulation generated when the traveling unit is coupled to the resting unit or the stimulation generated after the resting unit departs for the destination. Therefore, the user can be prevented from being awakened by the stimulation generated when the traveling unit is coupled to the resting unit or after the resting unit departs for the destination.

The control unit may transmit a command to the stimulation device to start to provide the user with stimulation smaller than the stimulation that the user receives when the traveling unit is coupled to the resting unit or stimulation smaller than the stimulation that the user receives after the resting unit departs for the destination, before the traveling unit is coupled to the resting unit or before the resting unit departs for the destination. In other words, the stimulation device provides the user in advance with stimulation smaller than the sound, the vibration, or the like, generated when the traveling unit is coupled to the resting unit or the sound, the vibration, or the like, generated after the resting unit departs for the destination. As such, the user can be prevented from being awakened and become accustomed to the stimulation.

The control unit may transmit a command to the stimulation device such that the stimulation provided to the user is gradually increased. If the stimulation provided to the user by the stimulation device is large from the beginning, the stimulation may cause the user to be awakened. On the other hand, when the stimulation is gradually increased, the user gradually becomes accustomed thereto. Therefore, the user can be prevented from being awakened.

When the stimulation device provides the user with stimulation including vibration, the control unit may transmit a command to the stimulation device such that an intensity of the vibration is gradually increased. There is a case where the resting unit is vibrated when the traveling unit is coupled to the resting unit or when the resting unit departs for the destination. In this case, there is a concern that the user may be awakened by the vibration. However, when the stimulation device provides the user with stimulation such that the intensity of the vibration is gradually increased, the user can become accustomed thereto. Therefore, the user can be prevented from being awakened by the vibration generated when the traveling unit is coupled to the resting unit or when the resting unit departs for the destination.

When the stimulation device provides the user with stimulation including sound, the control unit may transmit a command to the stimulation device such that a volume of the sound is gradually increased. There is a case where sound is generated when the traveling unit is coupled to the resting unit or when the resting unit departs for the destination. There is a concern that the user may be awakened by the sound. However, when the stimulation device provides the user with stimulation such that the volume of the sound is gradually increased, the user can become accustomed thereto. Therefore, the user can be prevented from being awakened by the sound generated when the traveling unit is coupled to the resting unit or when the resting unit departs for the destination.

In a case where the stimulation device starts to provide the user with stimulation before the traveling unit is coupled to the resting unit, the control unit may transmit a command to the stimulation device to stop providing the user with the stimulation after the traveling unit is coupled to the resting unit. In the case where the stimulation device is providing the user with stimulation in advance in order to prevent the user from being awakened when the traveling unit is coupled to the resting unit, it is not necessary to provide the user with the stimulation any longer after the traveling unit is coupled to the resting unit. Therefore, by stopping providing the user with the stimulation after the traveling unit is coupled to the resting unit, it is possible to prevent the stimulation from being provided to the user more than necessary.

When the stimulation device starts to provide the user with stimulation before the traveling unit departs for the destination after being coupled to the resting unit, the control unit may transmit a command to the stimulation device to stop providing the user with the stimulation after the traveling unit is coupled to the resting unit and departs for the destination. In a case where the stimulation device is providing the user with stimulation in advance in order to prevent the user from being awakened when the resting unit departs, it is not necessary to provide the user with the stimulation any longer after the resting unit departs. Therefore, by stopping providing the user with the stimulation after the resting unit departs, it is possible to prevent the stimulation from being provided to the user more than necessary.

Hereinafter, embodiments of the present disclosure will be described with reference to the drawings. Configurations of the following embodiments are mere examples, and the present disclosure is not limited thereto. Further, the following embodiments can be combined as much as possible.

First Embodiment

FIG. 1 is a diagram illustrating a schematic configuration of an autonomous driving system 1 according to an embodiment. The autonomous driving system 1 includes, for example, a vehicle 10, a user terminal 20, and a server 30. The vehicle 10 includes, for example, a resting unit 10A and a traveling unit 10B. The resting unit 10A can be decoupled from the traveling unit 10B. Moreover, the resting unit 10A can be coupled to another traveling unit 10B. The number of the resting unit 10A and the traveling unit 10B is not limited to one as exemplified in FIG. 1, and may be two or more. The traveling unit 10B is a mobile object that can autonomously travel based on an operation command generated by the server 30. In FIG. 1, a user operates the user terminal 20 and requests usage of the resting unit 10A. Information on the usage request is transmitted from the user terminal 20 to the server 30 according to the content input to the user terminal 20 by the user. The number of users may be plural, and corresponding to the number of users, the number of user terminals 20 may also be plural.

The autonomous driving system 1 illustrated in FIG. 1 is a system in which the server 30 provides the resting unit 10A at the user's request for using the resting unit 10A. The user transmits information on the request for using the resting unit 10A to the server 30 via the user terminal 20. The information on the usage request includes information on the user's destination, information on the arrival time (hereinafter, also referred to as a "desired arrival time") desired by the user, and information on a predetermined place in which the user uses the resting unit 10A. The user's destination is a destination to which the user moves while aboard the resting unit 10A. The desired arrival time is a target value of a time when the resting unit 10A coupled to the traveling unit 10B arrives at the user's destination. The predetermined place may be a place (for example, a parking lot) in which the resting unit 10A is arranged in advance.

The resting unit 10A serves as a resting place for the user. The user can sleep in the resting unit 10A. The resting unit 10A includes, for example, a bed on which the user can sleep. The traveling unit 10B carries the resting unit 10A while coupled thereto. The resting unit 10A can be carried by the traveling unit 10B while coupled thereto. The resting unit 10A can be carried by the traveling unit 10B while the user is aboard. Moreover, the resting unit 10A can serve as a resting place even while not coupled to the traveling unit 10B. In addition, the traveling unit 10B can move even while not coupled to the resting unit 10A. Further, in FIG. 1, the resting unit 10A can be vertically decoupled from the traveling unit 10B, but not limited thereto, and the resting unit 10A can be, for example, decoupled from the traveling unit 10B in the back and forth direction.

Upon receiving the information on the usage request from the user terminal 20, the server 30 allocates, to the user, a resting unit 10A, for example, arranged in a predetermined place. The server 30 transmits to the user terminal 20, for example, an identification number of the resting unit 10A allocated to the user. At this time, the resting unit 10A is decoupled from the traveling unit 10B and arranged in the predetermined place in advance. When there is no vacant resting unit 10A in the predetermined place, a vacant resting unit 10A in another place may be carried by the traveling unit 10B to the predetermined place. In this case, the server 30 transmits a command to the traveling unit 10B to carry the resting unit 10A to the predetermined place. The command may include, for example, information on the predetermined place or information on a route to the predetermined place. The command may also include, for example, a command to pass through a current position of the resting unit 10A in order to be coupled to the resting unit 10A. In addition, the command may include, for example, a command to be coupled to the resting unit 10A and carry it to the predetermined place, and a command to be decoupled from the resting unit 10A in the predetermined place. After being decoupled from the resting unit 10A in the predetermined place, the traveling unit 10B can autonomously travel to move to another place. As such, the traveling unit 10B can carry another resting unit 10A.

Further, the server 30 transmits a command to the traveling unit 10B such that the resting unit 10A which the user is aboard arrives at the destination at the desired arrival time. The command includes, for example, information on the predetermined place and information on the destination. The command may also include, for example, information on a route from the predetermined place to the destination. Moreover, the command also includes, for example, a command to pass through the predetermined place in order to be coupled to the resting unit 10A, and a command to be coupled to the resting unit 10A in the predetermined place and carry it to the destination. In addition, the command also includes, for example, information on a time at which the traveling unit 10B coupled to the resting unit 10A departs from the predetermined place, or information on the desired arrival time. A time at which the traveling unit 10B coupled to the resting unit 10A departs from the predetermined place is set so that the traveling unit 10B can arrive at the destination at the desired arrival time. For example, the server 30 may estimate a time required to move from the predetermined place to the destination based on a speed limit and information on roads from the predetermined place to the destination.

Here, there is a case where the traveling unit 10B is coupled to the resting unit 10A and the resting unit 10A departs for the destination while the user is sleeping inside the resting unit 10A. In this case, there is a concern that the user may be awakened by stimulation, such as the sound or the vibration generated when the resting unit 10A departs or when the traveling unit 10B is coupled to the resting unit 10A. Accordingly, there is a concern that it is difficult for the user to get a sufficient amount of sleep. Thus, the resting unit 10A starts to provide the user with stimulation before the resting unit 10A departs for the destination or before the traveling unit 10B is coupled to the resting unit 10A. For this reason, the resting unit 10A includes a stimulation device that provides the user with stimulation. The stimulation device may stimulate the user using sound or vibration.

For example, when stimulating the user using sound, the stimulation device starts to play, from a speaker at a volume lower than the volume of the sound actually heard, sound similar to the sound (hereinafter, also referred to as "traveling sound") heard inside the resting unit 10A during traveling, or the sound (hereinafter, also referred to as "coupling sound") heard inside the resting unit 10A during the coupling of the resting unit 10A to the traveling unit 10B before the resting unit 10A departs for the destination or before the traveling unit 10B is coupled to the resting unit 10A. In this manner, since the user is accustomed in advance to at least one of the traveling sound and the coupling sound, the user can be prevented from being awakened by a sudden loud sound during actual traveling or actual coupling. Characteristics of the sound played from the speaker (for example, frequency, amplitude, and sound pressure) may be based on data obtained by sound actually measured in the past.

In addition, for example, when stimulating the user using vibration, the stimulation device starts to provide, in a state smaller than the vibration actually generated, vibration similar to the vibration generated during traveling or coupling before the resting unit 10A departs for the destination or before the traveling unit 10B is coupled to the resting unit 10A. In this manner, since the user is accustomed in advance to at least one of the vibration during traveling and the vibration during coupling, the user can be prevented from being awakened by a sudden large vibration during actual traveling or actual coupling. Characteristics of the vibration (for example, frequency and amplitude) may be based on data obtained by vibration actually measured in the past. The stimulation device may provide the user with stimulation using both sound and vibration. Moreover, the stimulation provided to the user is not limited to sound and vibration, and may be any stimulation related to the stimulation received by the user when the resting unit 10A departs or when the traveling unit 10B is coupled to the resting unit 10A. For example, the stimulation device may start to provide the user with stimulation using light before the resting unit 10A departs for the destination or before the traveling unit 10B is coupled to the resting unit 10A.

The resting unit 10A, the traveling unit 10B, the user terminal 20, and the server 30 are connected to one another via a network N1. The network N1 may be, for example, a world-wide public communication network, such as the Internet, and a wide area network (WAN) or another communication network may be employed as the network N1. In addition, the network N1 may include a telephone communication network, such as a mobile phone, and a wireless communication network, such as Wi-Fi®.

Hardware Configuration

Figure 2:
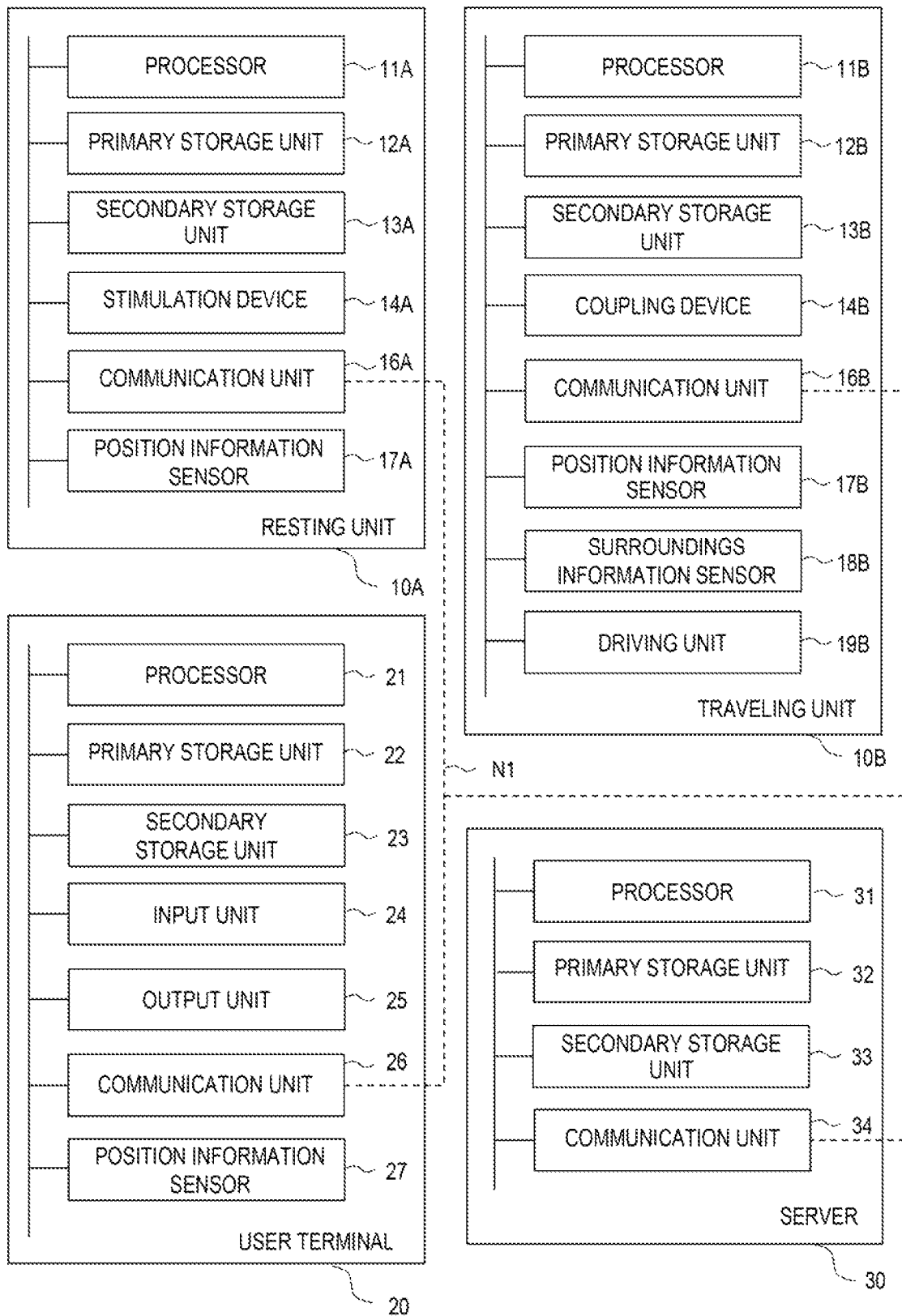
FIG. 2 is a block diagram schematically illustrating an example of a configuration of each of a resting unit, a traveling unit, a user terminal, and a server which compose the autonomous driving system according to the embodiment.

Hardware configurations of the resting unit 10A, the traveling unit 10B, the user terminal 20, and the server 30 will be described with reference to FIG. 2. FIG. 2 is a block diagram schematically illustrating an example of a configuration of each of the resting unit 10A, the traveling unit 10B, the user terminal 20, and the server 30 that compose the autonomous driving system 1 according to the present embodiment.

The server 30 includes a general computer configuration. The server 30 includes a processor 31, a primary storage unit 32, a secondary storage unit 33, and a communication unit 34. They are connected to one another via buses.

Examples of the processor 31 include a central processing unit (CPU) and a digital signal processor (DSP). The processor 31 controls the server 30 and executes calculations of various information processes. The processor 31 is an example of the "control unit". Examples of the primary storage unit 32 include a random access memory (RAM) and a read-only memory (ROM). Examples of the secondary storage unit 33 include an erasable programmable ROM (EPROM), a hard disk drive (HDD), and a removable medium. The secondary storage unit 33 stores an operating system (OS), various programs, various tables, and the like. The processor 31 loads a program stored in the secondary storage unit 33 into a work area of the primary storage unit 32 and executes the program, such that each component, and the like, is controlled. Accordingly, the server 30 implements a function corresponding to a predetermined purpose. The primary storage unit 32 and the secondary storage unit 33 are computer-readable recording media. Moreover, the server 30 may be a single computer or a plurality of computers that is linked to one another. Information stored in the secondary storage unit 33 may be stored in the primary storage unit 32. On the other hand, information stored in the primary storage unit 32 may be stored in the secondary storage unit 33.

The server 30 communicates with the traveling unit 10B and the user terminal 20 via the network N1 by the communication unit 34. Examples of the communication unit 34 include a local area network (LAN) interface board or a wireless communication circuit for wireless communication. The LAN interface board or the wireless communication circuit is connected to the network N1.

A series of processes executed by the server 30 may be implemented by hardware, but may also be implemented by software. The hardware configuration of the server 30 is not limited to that illustrated in FIG. 2. Moreover, a part or the whole of the configuration of the server 30 may be mounted on the traveling unit 10B.

Next, the traveling unit 10B will be described. The traveling unit 10B includes a processor 11B, a primary storage unit 12B, a secondary storage unit 13B, a coupling device 14B, a communication unit 16B, a position information sensor 17B, a surroundings information sensor 18B, and a driving unit 19B. They are connected to one another via buses. Since the processor 11B, the primary storage unit 12B, the secondary storage unit 13B, and the communication unit 16B are respectively the same as the processor 31, the primary storage unit 32, the secondary storage unit 33, and the communication unit 34 of the server 30, description thereof will be omitted.

The coupling device 14B couples or decouples the resting unit 10A to or from the traveling unit 10B based on a control command generated by the processor 11B. The coupling device 14B includes, for example, a slope, a rail, and a crane, and the like, via which the resting unit 10A is coupled to the traveling unit 10B. The coupling device 14B includes an actuator, which is activated when the resting unit 10A is coupled to or decoupled from the traveling unit 10B. A method of coupling the resting unit 10A to the traveling unit 10B is not limited.

The traveling unit 10B is connected to the network N1 via the communication unit 16B. The communication unit 16B is a circuit that communicates with another device (such as the server 30) via the network N1 using, for example, a mobile communication service (for example, a telephone communication network, such as Fifth Generation (5G), Fourth Generation (4G), Third Generation (3G), and Long-term Evolution (LTE)) or a wireless communication network, such as Wi-Fi®.

The position information sensor 17B acquires position information (for example, the latitude and longitude) of the traveling unit 10B at predetermined intervals. Examples of the position information sensor 17B include a global positioning system (GPS) receiving unit and a wireless communication unit. The information acquired by the position information sensor 17B is recorded in, for example, the secondary storage unit 13B and transmitted to the server 30.

The surroundings information sensor 18B senses a state or surroundings of the traveling unit 10B. An acceleration sensor, a speed sensor, or an azimuth sensor may be used as the sensor that senses the state of the traveling unit 10B. In addition, a stereo camera, a laser scanner, a LIDAR, a radar, and the like, may be used as the sensor that senses the surroundings of the traveling unit 10B.

The driving unit 19B causes the traveling unit 10B to travel based on the control command generated by the processor 11B. The driving unit 19B includes, for example, a motor that drives wheels provided at the traveling unit 10B, an inverter, a brake, a steering mechanism, or the like. By driving the motor, the brake, or the like, according to the control command, the traveling unit 10B can autonomously travel.

Next, the resting unit 10A will be described. The resting unit 10A includes a processor 11A, a primary storage unit 12A, a secondary storage unit 13A, a stimulation device 14A, a communication unit 16A, and a position information sensor 17A. They are connected to one another via buses. Since the processor 11A, the primary storage unit 12A, the secondary storage unit 13A, the communication unit 16A, and the position information sensor 17A of the resting unit 10A are respectively the same as the processor 11B, the primary storage unit 12B, the secondary storage unit 13B, the communication unit 16B, and the position information sensor 17B of the traveling unit 10B, description thereof will be omitted.

The stimulation device 14A provides stimulation to the user who is sleeping in the resting unit 10A. The stimulation device 14A may output, for example, sound. In this case, the stimulation device 14A includes, for example, a speaker. Further, the stimulation device 14A may apply vibration to the entire resting unit 10A or the bed included in the resting unit 10A. In this case, the stimulation device 14A includes, for example, an actuator.

Next, the user terminal 20 will be described. The user terminal 20 is a small computer, such as a smart-phone, a mobile phone, a tablet terminal, a personal information terminal, a wearable computer (a smart watch, or the like), and a personal computer (PC). The user terminal 20 includes a processor 21, a primary storage unit 22, a secondary storage unit 23, an input unit 24, an output unit 25, a communication unit 26, and a position information sensor 27. They are connected to one another via buses. Since the processor 21, the primary storage unit 22, the secondary storage unit 23, the communication unit 26, and the position information sensor 27 are respectively the same as the processor 11B, the primary storage unit 12B, the secondary storage unit 13B, the communication unit 16B, and the position information sensor 17B of the traveling unit 10B, description thereof will be omitted.

The input unit 24 receives an input operation by the user, and may be, for example, a touch panel and a push button. The output unit 25 presents information to the user, and may be, for example, a liquid crystal display (LCD), an electroluminescence (EL) panel, a speaker, and a lamp. The input unit 24 and the output unit 25 may be configured as one touch panel display.

Functional Configuration: Server

Figures 3, 4, 5:
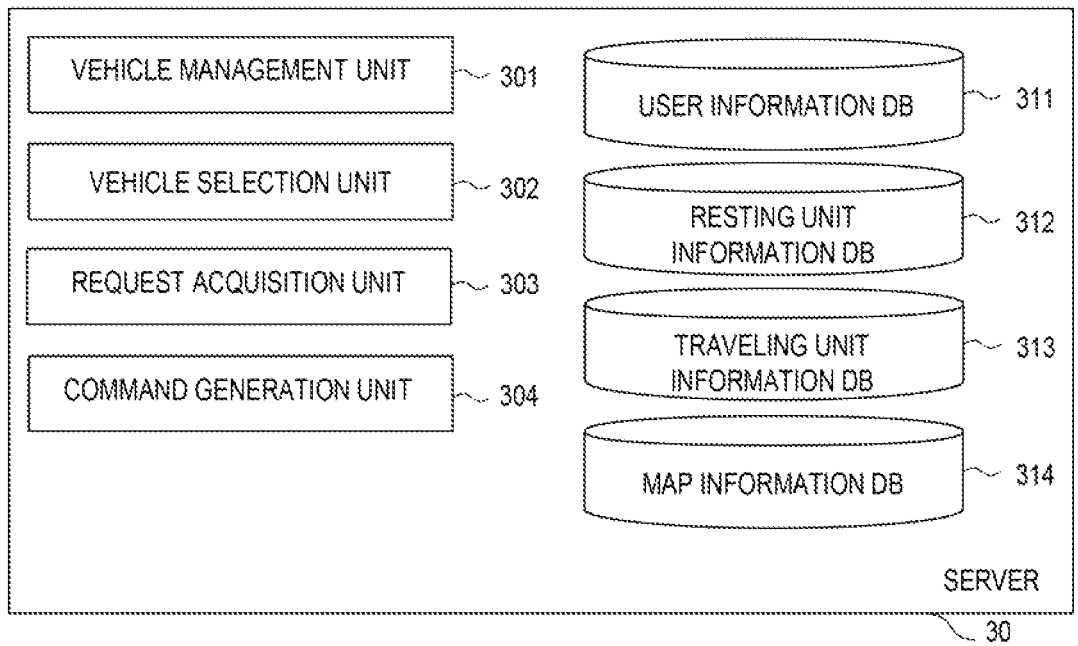
FIG. 3 is a diagram illustrating an example of a functional configuration of the server.
FIG. 4 is a table exemplifying a composition of user information.
FIG. 5 is a table exemplifying a composition of resting unit information.

FIG. 3 is a diagram illustrating an example of a functional configuration of the server 30. The server 30 includes, as functional components, a vehicle management unit 301, a vehicle selection unit 302, a request acquisition unit 303, a command generation unit 304, a user information database (DB) 311, a resting unit information DB 312, a traveling unit information DB 313, and a map information DB 314. The vehicle management unit 301, the vehicle selection unit 302, the request acquisition unit 303, and the command generation unit 304 are functional components provided when, for example, the processor 31 of the server 30 executes various programs stored in the secondary storage unit 33.

The user information DB 311, the resting unit information DB 312, the traveling unit information DB 313, and the map information DB 314 are, for example, relational databases that are constructed when a program of a database management system (DBMS) executed by the processor 31 manages data stored in the secondary storage unit 33. Any of the functional components of the server 30 or a part of the processes thereof may be executed by another computer connected to the network N1.

The vehicle management unit 301 manages various pieces of information on the resting unit 10A and the traveling unit 10B. The vehicle management unit 301 manages, for example, a position and an operating state of the resting unit 10A, and a position and an operating state of the traveling unit 10B. The vehicle management unit 301 acquires and manages, for example, position information transmitted from the resting unit 10A at predetermined intervals or position information transmitted from the resting unit 10A in response to a request from the server 30. Moreover, the vehicle management unit 301 acquires and manages, for example, position information transmitted from the traveling unit 10B at predetermined intervals or position information transmitted from the traveling unit 10B in response to a request from the server 30. When the traveling unit 10B is coupled to the resting unit 10A, the position information of the coupled resting unit 10A may be regarded as the same as that of the traveling unit 10B. On the other hand, when the traveling unit 10B is decoupled from the resting unit 10A, the position information of the resting unit 10A may be regarded as the same as that of the traveling unit 10B at a time when the traveling unit 10B is decoupled from the resting unit 10A. For this reason, the position information sensor 17A of the resting unit 10A may be omitted. The vehicle management unit 301 stores the position information of the resting unit 10A in the resting unit information DB 312 in association with a resting unit ID. The resting unit ID is an identifier unique to the resting unit 10A. Further, the vehicle management unit 301 stores the position information of the traveling unit 10B in the traveling unit information DB 313 in association with a traveling unit ID. The traveling unit ID is an identifier unique to the traveling unit 10B.

Moreover, the vehicle management unit 301 manages the operating states of the resting unit 10A and the traveling unit 10B. The operating state of the resting unit 10A is information for determining which state the resting unit 10A is in. The operating state of the resting unit 10A is divided into three states, that is, a stand-by state, an operating state, and a maintenance state. For example, when the resting unit 10A stands by in a maintenance shop, or the like, it is assumed that the resting unit 10A is in the stand-by state. The maintenance shop may be, for example, a place in which the resting unit 10A is maintained and stored. When the resting unit 10A is arranged in a place in which it is provided to the user and is not scheduled to be provided to the user yet, it is assumed that the resting unit 10A is also in the stand-by state. In addition, when the resting unit 10A is scheduled to be provided to the user or is being used by the user, it is assumed that the resting unit 10A is in the operating state. When the resting unit 10A is coupled to the traveling unit 10B and is carried toward a predetermined place so as to be provided to the user, and when the resting unit 10A is reserved by the user, it is assumed that the resting unit 10A is also in the operating state. Further, when the resting unit 10A has not yet been maintained after the user has left the resting unit 10A, it is assumed that the resting unit 10A is in the maintenance state.

For example, when the server 30 receives a signal for requesting the usage of a resting unit 10A from the user terminal 20, a resting unit 10A arranged in a predetermined place enters the operating state. Alternatively, for example, when a signal indicating that the user has left the resting unit 10A is transmitted from the user terminal 20 to the server 30, the resting unit 10A enters the maintenance state. Alternatively, when information indicating that maintenance of the resting unit 10A is completed is transmitted to the server 30 from, for example, a terminal of the maintenance shop, the resting unit 10A enters the stand-by state. The server 30 can select a resting unit 10A in the stand-by state as a resting place. On the other hand, the server 30 cannot select a resting unit 10A in the operating state or the maintenance state as a resting place.

Meanwhile, the operating state of the traveling unit 10B is information for determining which state the traveling unit 10B is in. The operating state of the traveling unit 10B is divided into two states, that is, a stand-by state and an operating state. For example, when the traveling unit 10B is carrying the resting unit 10A to a destination, or when the traveling unit 10B is scheduled to carry the resting unit 10A to the destination, it is assumed that the traveling unit 10B is in the operating state. Alternatively, when the traveling unit 10B is not carrying the resting unit 10A and is not scheduled to carry the resting unit 10A, it is assumed that the traveling unit 10B is in the stand-by state.

For example, when the server 30 transmits, to the traveling unit 10B, a command to carry the resting unit 10A, the traveling unit 10B enters the operating state. The operating state includes a time when the traveling unit 10B arranges the resting unit 10A in the predetermined place, a time when the traveling unit 10B carries the resting unit 10A from the predetermined place to the user's destination, and a time when the traveling unit 10B carries the resting unit 10A from the user's destination to a maintenance shop. In addition, when a signal indicating that the traveling unit 10B has arranged the resting unit 10A in the predetermined place is transmitted from the traveling unit 10B to the server 30, or when a signal indicating that the traveling unit 10B has arranged the resting unit 10A in the maintenance shop is transmitted from the traveling unit 10B to the server 30, the traveling unit 10B enters the stand-by state.

The vehicle management unit 301 stores the operating state of the resting unit 10A in the resting unit information DB 312 in association with the resting unit ID, and stores the operating state of the traveling unit 10B in the traveling unit information DB 313 in association with the traveling unit ID.

The vehicle selection unit 302 selects a resting unit 10A allocated to the user from among, for example, a plurality of resting units 10A in the stand-by state. When there is a plurality of resting units 10A in a predetermined place, the server 30 may randomly select a resting unit 10A. Alternatively, when the user selects a resting unit 10A and transmits information on the selected resting unit 10A from the user terminal 20 to the server 30, the vehicle selection unit 302 may allocate the resting unit 10A to the user. Further, the vehicle selection unit 302 may select a traveling unit 10B that will carry the resting unit 10A which the user is aboard from a predetermined place to the user's destination from among, for example, the traveling units 10B in the stand-by state. When there is a plurality of traveling units 10B in the stand-by state, the vehicle selection unit 302 may select, for example, a traveling unit 10B having a current position closest to the predetermined place, or randomly select a traveling unit 10B. Alternatively, when the traveling units 10B are electrically driven, the vehicle selection unit 302 may select a traveling unit 10B having the highest battery charging rate. Alternatively, the vehicle selection unit 302 may select a traveling unit 10B of which a movement distance or a movement time period is shortest. Alternatively, the vehicle selection unit 302 may select a traveling unit 10B of which a movement distance is within a predetermined distance. The predetermined distance may be, for example, a movement distance within an allowable range. The vehicle selection unit 302 transmits a resting unit ID corresponding to the selected resting unit 10A to the user terminal 20.

The request acquisition unit 303 acquires, for example, a usage request transmitted from the user terminal 20. The usage request is information for requesting an arrangement of a resting unit 10A and a traveling unit 10B via which the user can take a rest and move. The usage request includes, for example, position information of the user, information on a predetermined place in which the user desires to take a rest, information on a user's destination, and information on a desired arrival time at the destination. The usage request is generated in the user terminal 20 when the user makes a predetermined input to the input unit 24 of the user terminal 20.

The command generation unit 304 generates an operation command such that, for example, the traveling unit 10B departs from the current position (for example, a base), is coupled to the resting unit 10A in a predetermined place in which the resting unit 10A is arranged, and then moves to the user's destination. Further, the command generation unit 304 may generate the operation command such that the traveling unit 10B carries the resting unit 10A, which the user has left, to a maintenance shop, is decoupled from the resting unit 10A in the maintenance shop, and returns to the base. The operation command also includes information on time. For example, the operation command includes an arrival time at a predetermined place, a coupling time of the resting unit 10A to the traveling unit 10B in the predetermined place, a departure time from the predetermined place, and an arrival time at a destination.

For example, the command generation unit 304 calculates the coupling time of the resting unit 10A to the traveling unit 10B, or the departure time of the resting unit 10A and the traveling unit 10B such that the user arrives at the destination at the desired arrival time. In other words, the command generation unit 304 inversely calculates the coupling time or the departure time such that the user arrives at the destination at the desired arrival time. For example, the command generation unit 304 calculates a time required to move from the predetermined place to the user's destination based on a speed limit and information (for example, traffic jam information) on roads from the predetermined place to the user's destination, and sets a time before the desired arrival time by the required time as the departure time. Further, the server 30 sets the coupling time of the resting unit 10A to the traveling unit 10B based on a time required to couple the resting unit 10A to the traveling unit 10B.

The command generation unit 304 transmits the generated operation command to the traveling unit 10B. The command generation unit 304 according to the present embodiment may generate a route of the traveling unit 10B based on the map information stored in the map information DB 314 to be described below, and transmit the route to the traveling unit 10B. The command generation unit 304 may generate the route of the traveling unit 10B such that the route is according to predetermined rules, such as a route having a shortest movement distance or a route having a shortest movement time period.

In addition, the command generation unit 304 generates a command (hereinafter, also referred to as an activation command) to cause the stimulation device 14A to be activated, and transmits the generated command to the resting unit 10A. For example, the command generation unit 304 generates the activation command such that the stimulation device 14A is activated before a predetermined time period from when the resting unit 10A is coupled to the traveling unit 10B, or before a predetermined time period from when the resting unit 10A departs for the destination together with the traveling unit 10B after being coupled to the traveling unit 10B. The predetermined time period referred to here is a time required for the user to become accustomed to stimulation, and may be obtained by, for example, an experiment or a simulation, or may be a time desired by the user. The time desired by the user is, for example, transmitted from the user terminal 20 to the server 30, together with the usage request. Further, the predetermined time period may be changed depending on a departure place, a kind of stimulation, or a preference of the user. The activation command may include information on a timing to stop the stimulation device 14A. The timing to stop the stimulation device 14A is set after the resting unit 10A is coupled to the traveling unit 10B or after the resting unit 10A departs. The timing to stop the stimulation device 14A is a time at which the stimulation device 14A does not have to provide the user with stimulation. The timing to stop the stimulation device 14A may be, for example, a time immediately after the coupling time or the departure time, or a time after a certain time period elapses from the coupling time or the departure time.

The user information DB 311 is formed by storing user information in the secondary storage unit 33. The user information may include, for example, a user ID in association with the user, a predetermined place in which the user desires to take a rest, the user's destination, and the desired arrival time. Here, a configuration of the user information stored in the user information DB 311 will be described with reference to FIG. 4. FIG. 4 is a table exemplifying a composition of the user information. The user information table includes fields for the user ID, the predetermined place, the destination, the desired arrival time, and a resting state. Information for specifying the user or the user terminal 20 is input in the user ID field. Information on a place in which the user desires to take a rest is input in the predetermined place field. The place in which the user desires to take a rest may be the place which the user inputs to the user terminal 20, or a place based on the current position acquired from the user terminal 20. Information on the user's destination is input in the destination field. Information on the desired arrival time is input in the desired arrival time field. The usage request includes the information on each of the user ID, the predetermined place, the destination, and the desired arrival time. Information on the user's resting state is input in the resting state field. Any one of "requested", "arranged", or "finished" is input as the information on the resting state in the resting state field. For example, "requested" is input in the resting state field from a time when the server 30 receives the usage request to a time when the server 30 selects a resting unit 10A and a traveling unit 10B. In addition, "arranged" is input in the resting state field from a time when the server 30 selects a resting unit 10A and a traveling unit 10B to a time when the server 30 receives a leaving request. The leaving request is information transmitted from the user terminal 20 when the user leaves the resting unit 10A, and is information indicating that the user is leaving the resting unit 10A. The leaving request includes the user ID. Further, "finished" is input in the resting state field after the server 30 receives the leaving request.

The resting unit information DB 312 is formed by storing the information (hereinafter, also referred to as "resting unit information") on the resting unit 10A in the secondary storage unit 33. Here, a configuration of the resting unit information stored in the resting unit information DB 312 will be described with reference to FIG. 5. FIG. 5 is a table exemplifying a composition of the resting unit information. The resting unit information table includes fields for the resting unit ID, the position information, the operating state, and the user ID. Identification information for specifying the resting unit 10A is input in the resting unit ID field. The position information of the resting unit 10A is input in the position information field. The position information is information indicating the current position of the resting unit 10A. When the resting unit 10A is decoupled from the traveling unit 10B, the current position of the resting unit 10A is fixed until the resting unit 10A is coupled to the next traveling unit 10B. Information indicating which state the resting unit 10A is in is input in the operating state field. Any one of "stand-by", "operating", or "under maintenance" is input in the operating state field. "Stand-by" indicates a state where the resting unit 10A stands by in a maintenance shop, a predetermined place, or the like, "operating" indicates a state where the resting unit 10A is reserved or being used by the user, and "under maintenance" indicates a state where the resting unit 10A needs maintenance after the user has left the resting unit 10A. The user ID of the user who is using the resting unit 10A is input in the user ID field. Therefore, when the leaving request is transmitted from the user terminal 20, it is possible to determine the corresponding resting unit 10A based on the user ID.

The traveling unit information DB 313 is formed by storing information on the traveling unit 10B (hereinafter, also referred to as "traveling unit information") in the secondary storage unit 33. Here, a configuration of the traveling unit information stored in the traveling unit information DB 313 will be described with reference to FIG. 6. FIG. 6 is a table exemplifying a composition of the traveling unit information. The traveling unit information table includes fields for a traveling unit ID, position information, and an operating state. Information for specifying the traveling unit 10B is input in the traveling unit ID field. The position information of the traveling unit 10B is input in the position information field. The position information is information indicating the current position of the traveling unit 10B. Information indicating which state the traveling unit 10B is in is input in the operating state field. Any one of "operating" or "stand-by" is input in the operating state field.

"Operating" indicates a state where the traveling unit 10B is carrying the resting unit 10A to the destination or a state where the traveling unit 10B is scheduled to carry the resting unit 10A to the destination, and "stand-by" indicates a state where the traveling unit 10B is not carrying the resting unit 10A and is not scheduled to carry the resting unit 10A. The state where the traveling unit 10B is not scheduled to carry the resting unit 10A is, for example, a state where there is no operation command to carry the resting unit 10A. The operating state may be transmitted by the traveling unit 10B or determined by the server 30 based on the current position of the traveling unit 10B.

The map information DB 314 stores map information that includes map data and point-of-interest (POI) information, such as characters and photographs, indicating features of each point on the map data. The map information DB 314 may be provided from another system connected to the network N1, for example, a geographic information system (GIS).

Functional Configuration: Traveling Unit

FIG. 7 is a diagram illustrating an example of a functional configuration of the traveling unit 10B. The traveling unit 10B includes, as functional components, an operation plan generation unit 101, a surroundings detection unit 102, a traveling control unit 103, a position information transmission unit 104, and a resting unit management unit 105. The operation plan generation unit 101, the surroundings detection unit 102, the traveling control unit 103, the position information transmission unit 104, and the resting unit management unit 105 are functional components provided when, for example, the processor 11B of the traveling unit 10B executes various programs stored in the secondary storage unit 13B.

The operation plan generation unit 101 acquires an operation command from the server 30 and generates its own operation plan. The operation command includes information on a stopover, through which the traveling unit 10B passes, and a destination. The stopover may include a point at which the traveling unit 10B is coupled to the resting unit 10A. The operation plan generation unit 101 calculates a route along which the traveling unit 10B moves based on the operation command acquired from the server 30, and generates an operation plan for moving according to the route.

The surroundings detection unit 102 detects the surroundings of the traveling unit 10B needed for autonomous traveling based on data acquired by the surroundings information sensor 18B. Examples of targets to be detected include the number and positions of vehicle lanes, the number and positions of other mobile objects around the traveling unit 10B, the number and position of obstacles (for example, pedestrians, bicycles, structures, and buildings) around the traveling unit 10B, the structure of roads, and road signs, but are not limited thereto. The target to be detected may be any target as long as it is needed for autonomous traveling. For example, when the surroundings information sensor 18B is a stereo camera, an object around the traveling unit 10B is detected by executing image processing on data of an image captured by the stereo camera. The data (hereinafter, referred to as "surroundings data") on the surroundings of the traveling unit 10B detected by the surroundings detection unit 102 is transmitted to the traveling control unit 103 to be described below.

The traveling control unit 103 generates a control command for controlling the autonomous traveling of the traveling unit 10B based on the operation plan generated by the operation plan generation unit 101, the surroundings data generated by the surroundings detection unit 102, and the position information of the traveling unit 10B acquired by the position information sensor 17B. For example, the traveling control unit 103 generates a control command to cause the traveling unit 10B to travel along a predetermined route such that an obstacle does not enter a predetermined safety area around the traveling unit 10B. The generated control command is transmitted to the driving unit 19B. A well-known method may be employed as a method of generating a control command to cause the traveling unit 10B to autonomously travel.

The position information transmission unit 104 transmits, to the server 30, position information acquired by the position information sensor 17B via the communication unit 16B. A timing at which the position information transmission unit 104 transmits the position information can be appropriately set. For example, the position information may be transmitted periodically, at a timing at which some information is transmitted to the server 30, or in response to a request from the server 30. The position information transmission unit 104 transmits the position information to the server 30 together with the traveling unit ID.

The resting unit management unit 105 generates a command on coupling and decoupling of the resting unit 10A to and from the traveling unit 10B. The command includes a command to instruct the coupling device 14B to couple the resting unit 10A to the traveling unit 10B, a command to instruct the coupling device 14B to decouple the resting unit 10A from the traveling unit 10B, and the like.

Functional Configuration: Resting Unit

FIG. 8 is a diagram illustrating an example of a functional configuration of the resting unit 10A. The resting unit 10A includes, as functional components, a position information transmission unit 111 and a stimulation device management unit 112. The position information transmission unit 111 and the stimulation device management unit 112 are functional components provided when, for example, the processor 11A of the resting unit 10A executes various programs stored in the secondary storage unit 13A.

The position information transmission unit 111 has the same function as that of the position information transmission unit 104 of the traveling unit 10B. The position information transmission unit 104 transmits the position information to the server 30 together with the resting unit ID.

The stimulation device management unit 112 generates a command for controlling the stimulation device 14A and outputs the command to the stimulation device 14A. The stimulation device management unit 112 activates the stimulation device 14A so as to provide the user with stimulation before the resting unit 10A is coupled to the traveling unit 10B, or before the resting unit 10A departs for the destination together with the traveling unit 10B after being coupled to the traveling unit 10B. The stimulation is set to a degree at which the user is not awakened. The degree at which the user is not awakened may be obtained by, for example, an experiment or a simulation, or set by the user via the user terminal 20. The stimulation device management unit 112 activates the stimulation device 14A according to the activation command received from the server 30.

Moreover, the stimulation device management unit 112 may gradually increase the stimulation while activating the stimulation device 14A. For example, at the start of activating the stimulation device 14A, the stimulation may hardly be provided to the user. On the other hand, by the end of activating the stimulation device 14A, the stimulation may be gradually increased such that the user is provided with stimulation corresponding to, or smaller than the stimulation actually generated at the coupling time or the departure time.

For example, when the stimulation device 14A generates sound as stimulation, the volume of the sound may be gradually increased. Further, for example, when the stimulation device 14A generates vibration as stimulation, the amplitude of the vibration may be gradually increased. The command to gradually increase the stimulation may be generated by the command generation unit 304 of the server 30 and transmitted from the server 30 to the resting unit 10A.

Functional Configuration: User Terminal

FIG. 9 is a diagram illustrating an example of a functional configuration of the user terminal 20. The user terminal 20 includes, as a functional component, an information transmission/reception unit 201. The information transmission/reception unit 201 is a functional component provided when, for example, the processor 21 of the user terminal 20 executes various programs stored in the secondary storage unit 23. The information transmission/reception unit 201 controls, for example, transmission of information to the server 30 or reception of information from the server 30. The information transmission/reception unit 201 outputs, for example, an icon for a usage request to a touch panel display of the user terminal 20, and generates a usage request when the user clicks on the icon. The usage request includes the position information of the user. The position information of the user may be obtained by the position information sensor 27 or may be input by the user via the input unit 24. The information transmission/reception unit 201 transmits, to the server 30, the generated usage request in association with the user ID.

Flow of Processing: Server

Figure 10:
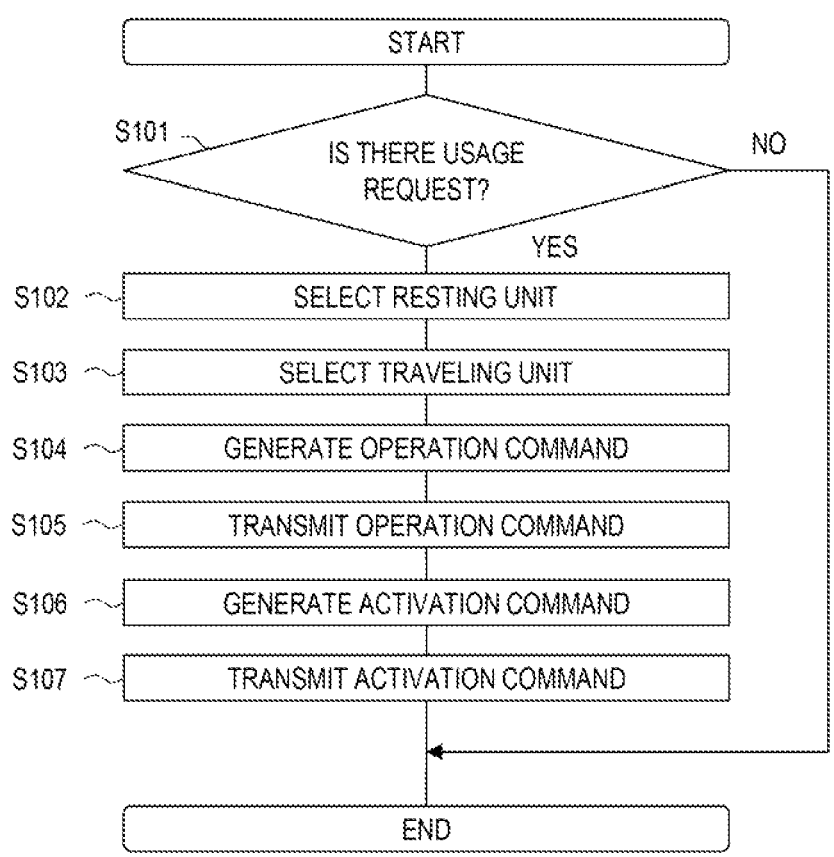
FIG. 10 is an example of a flowchart of a process in the server according to the embodiment.

Next, a process in the server 30 will be described. FIG. 10 is an example of a flowchart of a process in the server 30 according to the present embodiment. The process illustrated in FIG. 10 is executed by the processor 31 of the server 30 at every predetermined time. Here, it is assumed that the server 30 has already received information needed for constructing the resting unit information DB 312 and the traveling unit information DB 313.

In step S101, the request acquisition unit 303 determines whether it has received a usage request from a user terminal 20. The usage request includes information on the destination of the user who uses the resting unit 10A, information on the arrival time of the user at the destination, and information on the position of the user. In step S101, when the determination is positive, the process proceeds to step S102. On the other hand, when the determination is negative, the process ends.

In step S102, the vehicle selection unit 302 selects a resting unit 10A in which the user can take a rest. The vehicle selection unit 302 accesses the resting unit information DB 312 and the map information DB 314, and selects, for example, a resting unit 10A closest to the current position of the user from among the resting units 10A of which an operating state is "stand-by". The vehicle selection unit 302 may randomly select one resting unit 10A from among the resting units 10A, which are within a predetermined area from the current position of the user and of which the operating state is "stand-by". The vehicle selection unit 302 transmits a resting unit ID corresponding to the selected resting unit 10A to the user terminal 20.

In step S103, the vehicle selection unit 302 selects the traveling unit 10B that will carry the resting unit 10A selected in step S102. The vehicle selection unit 302 accesses the traveling unit information DB 313 and the map information DB 314, and selects, for example, a traveling unit 10B closest to the selected resting unit 10A from among the traveling units 10B of which an operating state is "stand-by". Alternatively, the vehicle selection unit 302 may randomly select a traveling unit 10B of which a movement distance from the current position of the traveling unit 10B to the current position of the resting unit 10A is within a predetermined distance. The predetermined distance is set, for example, such that a time required to arrive at the current position of the resting unit 10A is within an allowable range.

In step S104, the command generation unit 304 generates an operation command to be transmitted to the traveling unit 10B. The command generation unit 304 generates the operation command including a command to cause the traveling unit 10B to move from the current position thereof to the current position of the resting unit 10A, to be coupled to the resting unit 10A at the current position of the resting unit 10A, and to move from the current position of the resting unit 10A to the user's destination. The operation command may include a command to cause the traveling unit 10B to carry the resting unit 10A to a predetermined place (for example, a maintenance shop) after the user alights from the resting unit 10A at the destination. The operation command may include information on a time at which the traveling unit 10B arrives at the current position of the resting unit 10A, information on a time at which the traveling unit 10B departs from the current position of the resting unit 10A, and information on a time at which the traveling unit 10B arrives at the destination such that the traveling unit 10B can arrive at the destination at the desired arrival time. After the command generation unit 304 generates the operation command, the process proceeds to step S105, in which the command generation unit 304 transmits the operation command to the traveling unit 10B selected in step S103. At this time, the vehicle management unit 301 updates the operating state field of the corresponding resting unit 10A in the resting unit information DB 312 from "stand-by" to "operating", and a corresponding user ID is input in the user ID field. Further, the vehicle management unit 301 updates the operating state field of the corresponding traveling unit 10B in the traveling unit information DB 313 from "stand-by" to "operating".

In step S106, the command generation unit 304 generates an activation command to be transmitted to the resting unit 10A. The command generation unit 304 generates an activation command such that the stimulation device 14A is activated to provide the user with stimulation before a predetermined time period from when the resting unit 10A is coupled to the traveling unit 10B, or before a predetermined time period from when the resting unit 10A departs for the destination together with the traveling unit 10B after being coupled to the traveling unit 10B. A timing to activate the stimulation device 14A or a timing to stop the activation of the stimulation device 14A may be set in advance. After the command generation unit 304 generates the activation command, the process proceeds to step S107, in which the command generation unit 304 transmits the activation command to the resting unit 10A selected in step S102.

Flow of Processing: Traveling Unit

Figure 11:
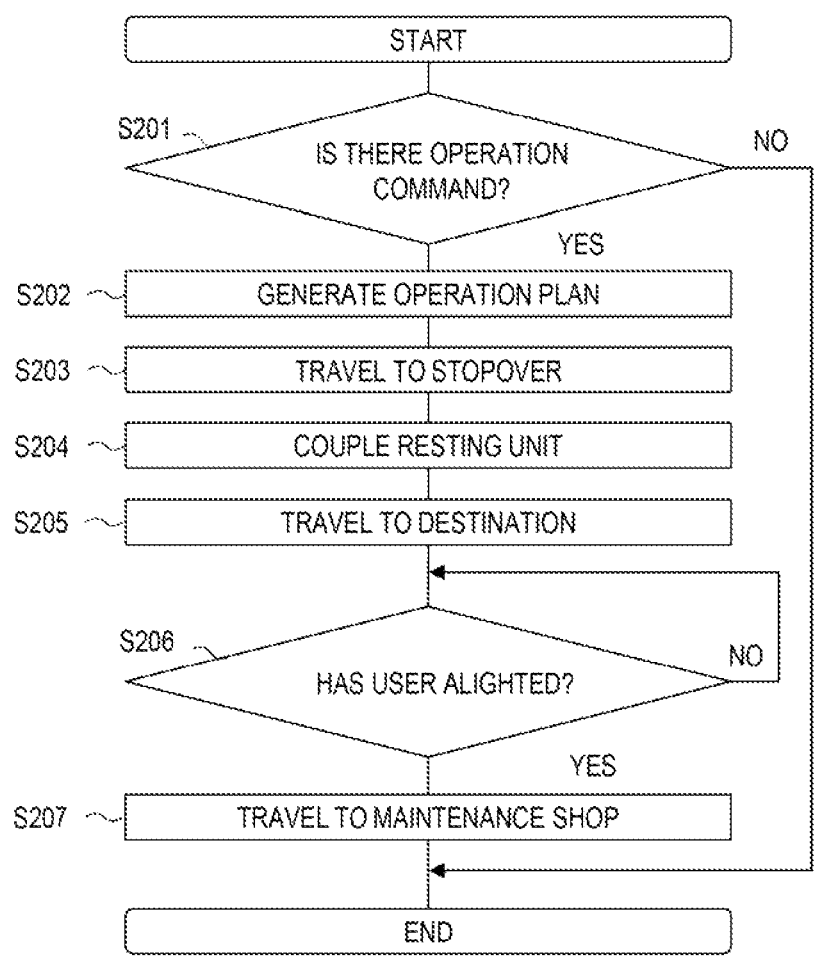
FIG. 11 is an example of a flowchart of a process in the traveling unit according to the embodiment.

Next, a process in the traveling unit 10B will be described. FIG. 11 is an example of a flowchart of a process in the traveling unit 10B according to the present embodiment. The process illustrated in FIG. 11 is executed by the processor 11B of the traveling unit 10B at every predetermined time. The flowchart is executed by the traveling unit 10B in the stand-by state.

In step S201, the operation plan generation unit 101 determines whether it has received the operation command from the server 30. In step S201, when the determination is positive, the process proceeds to step S202. On the other hand, when the determination is negative, the process ends. In step S202, the operation plan generation unit 101 generates an operation plan according to the operation command.

When the generation of the operation plan is completed, in step S203, the traveling control unit 103 generates a control command, and the driving unit 19B is controlled according to the control command such that the traveling unit 10B travels to the stopover. At the stopover, the resting unit 10A which the user is aboard is arranged. When the traveling unit 10B arrives at the stopover, the process proceeds to step S204, in which the resting unit management unit 105 controls the coupling device 14B such that the coupling device 14B couples the resting unit 10A to the traveling unit 10B. The resting unit 10A is a resting unit 10A which is selected by the server 30 and which the user is aboard. For example, the operation command transmitted from the server 30 includes a resting unit ID corresponding to the selected resting unit 10A, and the traveling unit 10B determines the resting unit 10A based on the resting unit ID. The traveling unit 10B may identify the resting unit 10A by, for example, reading the resting unit ID displayed on the resting unit 10A using the surroundings information sensor 18B, or by, for example, communicating with the resting unit 10A.

When the coupling of the resting unit 10A to the traveling unit 10B is completed, the process proceeds to step S205, in which the traveling control unit 103 generates a control command, and the driving unit 19B is controlled according to the control command such that the traveling unit 10B travels to the user's destination. When the traveling unit 10B arrives at the user's destination, the process proceeds to step S206, in which the resting unit management unit 105 determines whether the user has alighted from the resting unit 10A. For example, when a leaving request is received from the user terminal 20, the resting unit management unit 105 determines that the user has alighted from the resting unit 10A. In step S206, when the determination is positive, the process proceeds to step S207. On the other hand, when the determination is negative, the process of step S206 is re-executed. In step S207, the traveling control unit 103 generates a control command, and the driving unit 19B is controlled according to the control command such that the traveling unit 10B travels to the maintenance shop. When the traveling unit 10B arrives at the maintenance shop, the process ends. In the maintenance shop, the resting unit 10A is maintained.

Flow of Processing: Resting Unit

Figure 12:
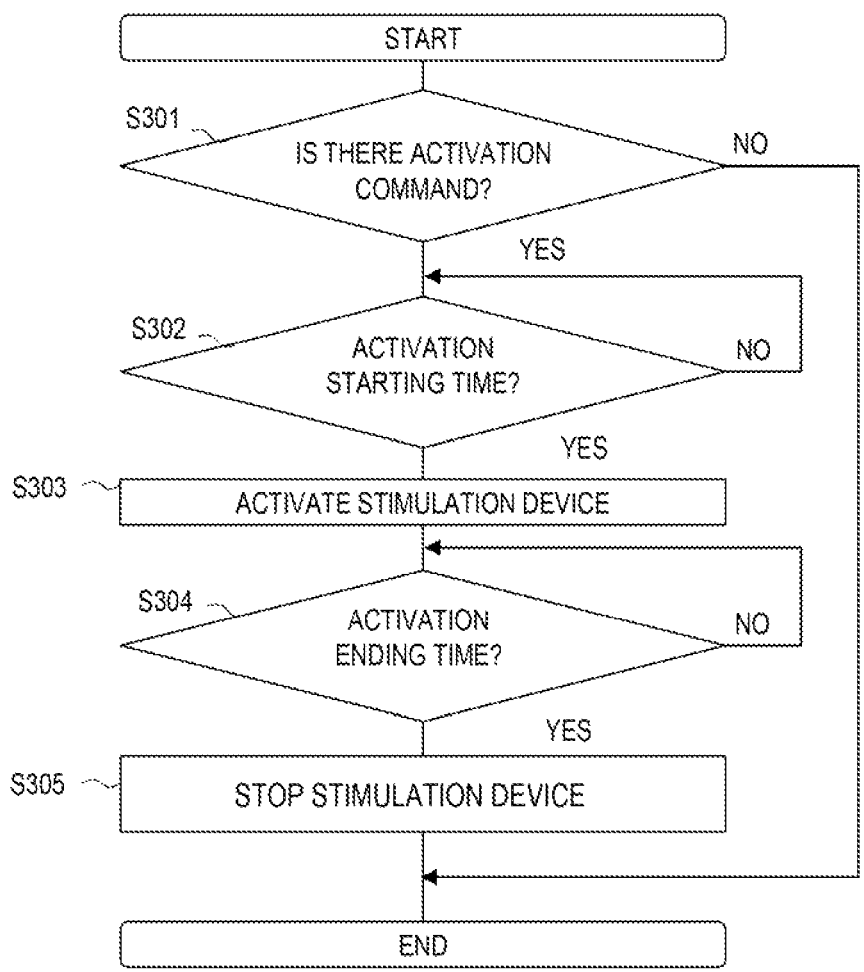
FIG. 12 is an example of a flowchart of a process for activating a stimulation device according to the embodiment.

Next, a process for activating the stimulation device 14A in the resting unit 10A will be described. FIG. 12 is an example of a flowchart of a process for activating the stimulation device 14A according to the present embodiment. The process illustrated in FIG. 12 is executed by the processor 11A of the resting unit 10A at every predetermined time.

In step S301, the stimulation device management unit 112 determines whether it has received the activation command from the server 30. In step S301, when the determination is positive, the process proceeds to step S302. On the other hand, when the determination is negative, the process ends. In step S302, the stimulation device management unit 112 determines whether it is an activation starting time of the stimulation device 14A. In this process, it is assumed that the activation starting time of the stimulation device 14A is included in the activation command transmitted from the server 30. In step S302, when the determination is positive, the process proceeds to step S303. On the other hand, when the determination is negative, the process of step S302 is re-executed.

In step S303, the stimulation device management unit 112 activates the stimulation device 14A. When the stimulation device management unit 112 activates the stimulation device 14A, the process proceeds to step S304, in which the stimulation device management unit 112 determines whether it is an activation ending time of the stimulation device 14A. In this process, it is assumed that the activation ending time of the stimulation device 14A is included in the activation command transmitted from the server 30. In step S304, when the determination is positive, the process proceeds to step S305, in which the stimulation device management unit 112 stops the stimulation device 14A. On the other hand, when the determination is negative, the process of step S304 is re-executed.

Flow of Processing: User Terminal

Figure 13:
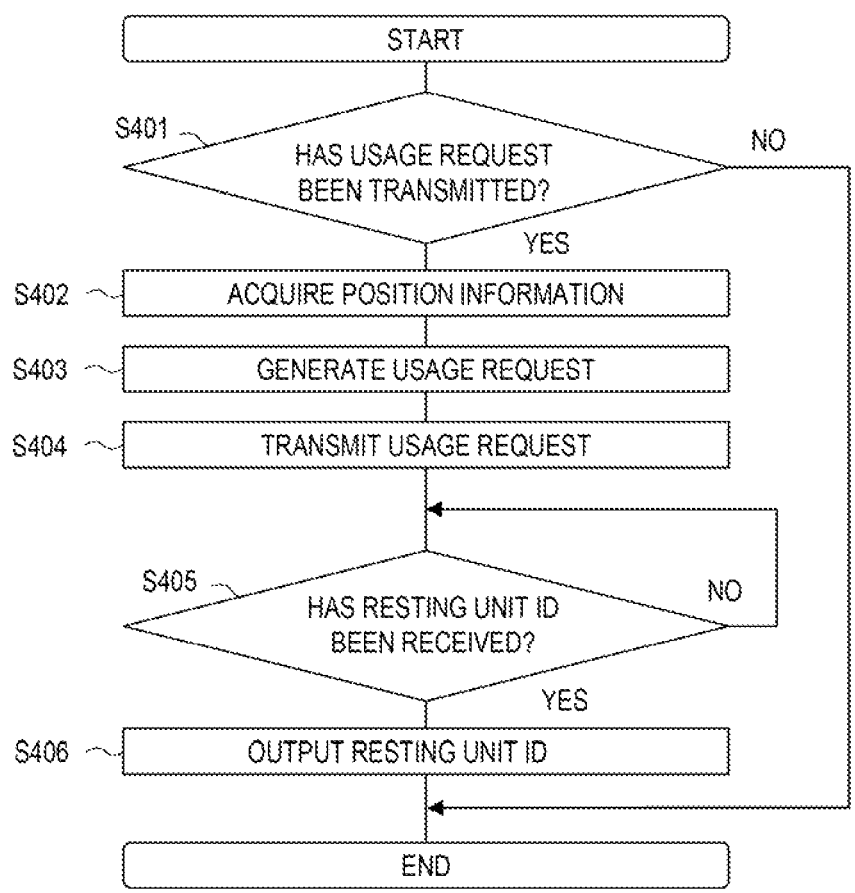
FIG. 13 is an example of a flowchart of a process for transmitting a usage request from the user terminal according to the embodiment.

Next, a process for transmitting a usage request from the user terminal 20 will be described. FIG. 13 is an example of a flowchart of a process for transmitting the usage request from the user terminal 20 according to the present embodiment. The process illustrated in FIG. 13 is executed by the processor 21 of the user terminal 20 at every predetermined time.

In step S401, the information transmission/reception unit 201 determines whether the user has executed an operation for transmitting a usage request via the input unit 24. The information transmission/reception unit 201 determines, for example, whether the user has clicked on an icon for transmitting the usage request. The icon for transmitting the usage request is displayed on, for example, the touch panel display and the information transmission/reception unit 201 determines whether the user has clicked on the icon. A timing of transmitting the usage request is not limited to when the user has clicked on the icon. In step S401, when the determination is positive, the process proceeds to step S402. On the other hand, when the determination is negative, the process ends. In step S402, the information transmission/reception unit 201 acquires the position information of the user terminal 20. In step S403, the information transmission/reception unit 201 generates a usage request. Then, in step S404, the information transmission/reception unit 201 transmits the usage request to the server 30.

In step S405, the information transmission/reception unit 201 determines whether it has received the resting unit ID from the server 30. Here, the received resting unit ID corresponds to the resting unit 10A that will be used by the user. In step S405, when the determination is positive, the process proceeds to step S406. On the other hand, when the determination is negative, the process of step S405 is re-executed. Subsequently, in step S406, the information transmission/reception unit 201 outputs the resting unit ID to the output unit 25. As such, the user can recognize which resting unit 10A he/she should board.

As described above, with the present embodiment, by using the vehicle 10 that autonomously travels, it is possible to provide the user with a resting place and carry the user to the destination. Since the user can arrive at the destination at the desired time while sleeping, the user does not have to manage time on his/her own while moving. Further, since the stimulation device 14A provides the user with stimulation before the resting unit 10A departs or before the resting unit 10A is coupled to the traveling unit 10B, the sleeping user can be prevented from being awakened by sound or vibration generated at the coupling time or the departure time. For this reason, the user can more comfortably take a rest.

Other Embodiments

The above-described embodiments are merely examples, and the present disclosure may be appropriately modified and implemented within a range not departing from the scope thereof.

The above processes or elements described in the present disclosure may be freely combined and implemented as long as no technical contradiction occurs.

Further, the processes described as being executed by one device may be executed in a shared manner by a plurality of devices. Alternatively, the processes described as being executed by different devices may be executed by one device. In the computer system, the hardware configuration (the server configuration) that implements each function may be flexibly changed. In the above embodiment, the server 30 includes, as functional components, the vehicle management unit 301, the vehicle selection unit 302, the request acquisition unit 303, the command generation unit 304, and the user information DB 311, the resting unit information DB 312, the traveling unit information DB 313, and the map information DB 314. The server 30 includes the vehicle management unit 301, the vehicle selection unit 302, the request acquisition unit 303, the command generation unit 304, but a part or all of these functional components may be included in the resting unit 10A, the traveling unit 10B, or the user terminal 20. Further, a part or all of the functional components of the user terminal 20 may be included in the resting unit 10A.

In the above embodiments, the user terminal 20 transmits the leaving request, but instead of the user terminal 20, the resting unit 10A may transmit the leaving request. For this reason, the resting unit 10A may include an input unit. Moreover, the resting unit 10A may include a sensor that detects the user's alighting from the resting unit 10A, and when the sensor detects the user's alighting, the resting unit 10A may transmit the leaving request to the server 30.

In the above embodiments, the server 30 transmits the activation command to the resting unit 10A, but the server 30 does not have to transmit the activation command. For example, the stimulation device management unit 112 may activate the stimulation device 14A based on the coupling time of the resting unit 10A to the traveling unit 10B, or the departure time of the resting unit 10A. The stimulation device management unit 112 may acquire the coupling time of the resting unit 10A to the traveling unit 10B, or the departure time of the resting unit 10A by communicating with the server 30, or with the traveling unit 10B. Since the operation command is transmitted from the server 30 to the traveling unit 10B, the resting unit 10A may acquire the information on the coupling time or the departure time through, for example, communication with the traveling unit 10B. Further, the server 30 may transmit the information on the coupling time or the departure time to the resting unit 10A.

The stimulation device management unit 112 activates the stimulation device 14A before a predetermined time period from the coupling time or the departure time. The predetermined time period referred to here is a time period required for the user to become accustomed to stimulation, and may be obtained by, for example, an experiment or a simulation, or may be input by the user via the user terminal 20. The predetermined time period may be set by the server 30 or stored in advance in the secondary storage unit 13A of the resting unit 10A. Further, when the traveling unit 10B approaches the resting unit 10A at a predetermined distance, the stimulation device management unit 112 may activate the stimulation device 14A so as to provide the user with stimulation. The stimulation device management unit 112 stops the stimulation device 14A after the coupling time or the departure time.

In the above embodiments, the resting unit 10A includes the stimulation device 14A, but instead of the resting unit 10A, the traveling unit 10B may include a device that provides the user with stimulation. In this case, before the traveling unit 10B is coupled to the resting unit 10A, the user cannot be provided with stimulation. However, before the resting unit 10A departs after being coupled to the traveling unit 10B, the user can be provided with stimulation.

The resting unit 10A that will be used by the user may be arranged in a predetermined place before the user arrives at the predetermined place. For example, the user may use the resting unit 10A arranged in advance in a parking lot, or the like. On the other hand, when the user desires to use the resting unit 10A, the traveling unit 10B may carry the resting unit 10A to the predetermined place and the user may use the carried resting unit 10A. In this case, the server 30 may generate an operation command to carry the resting unit 10A to the predetermined place, and the operation command is transmitted from the server 30 to the traveling unit 10B.

In addition, the user can reserve the resting unit 10A via the user terminal 20. The server 30 may generate an operation command such that the traveling unit 10B carries the resting unit 10A and arrange it in a predetermined place at a time reserved by the user. However, reservation is not mandatory. The user can also use the resting unit 10A arranged in a predetermined place. A usage request may be transmitted from the user terminal 20 to the server 30 before or after the user boards the resting unit 10A. Further, the usage request may be transmitted from the resting unit 10A to the server 30. In this case, the user terminal 20 may notify the resting unit 10A of the user ID. Further, the resting unit 10A may include an input unit, and the user may input predetermined items (for example, the user ID, a password, the destination, and the desired arrival time) thereto.

The present disclosure may also be implemented by supplying a computer program having the functions described in the above embodiments to a computer, and reading and executing the program by one or more processors included in the computer. Such a computer program may be provided to the computer by a non-transitory computer-readable storage medium that can be connected to the computer system bus, or provided to the computer via the network. Examples of the non-transitory computer-readable storage medium include any kind of disk, such as a magnetic disk (a Floppy® disk, a hard disk drive (HDD), and the like), an optical disk (a CD-ROM, a DVD disk, a Blu-ray disk, and the like), a read-only memory (ROM), a random access memory (RAM), an EPROM, an EEPROM, a magnetic card, a flash memory, an optical card, and any kind of medium suitable for storing electronic commands.

What is claimed is:

1. An information processing device comprising a control unit configured to:

acquire information on a destination of a user who uses a resting unit, information on an arrival time at the destination, and information on a place in which the user uses the resting unit, wherein the resting unit comprises equipment on which the user is able to sleep inside the resting unit;

transmit a command to a traveling unit configured to be coupled to the resting unit and carry the resting unit such that the traveling unit is coupled to the resting unit and arrives at the destination at the arrival time, the traveling unit being configured to be movable even while not coupled to the resting unit, wherein the traveling unit comprises a driving unit that includes a motor that drives wheels and a steering mechanism that steers the wheels; and transmit a command to a stimulation device configured to stimulate the user who is using the resting unit such that the stimulation device is activated before the traveling unit is coupled to the resting unit or before the traveling unit departs for the destination after being coupled to the resting unit, wherein the control unit is configured to transmit a command to the stimulation device to start to provide the user with stimulation smaller than stimulation that the user receives when the traveling unit is coupled to the resting unit or stimulation smaller than stimulation that the user receives after the traveling unit departs for the destination, before the traveling unit is coupled to the resting unit or before the traveling unit departs for the destination.

2. The information processing device according to claim 1, wherein the control unit is configured to transmit a command to the stimulation device such that stimulation provided to the user is gradually increased.

3. The information processing device according to claim 2, wherein the control unit is configured to transmit, when the stimulation device provides the user with stimulation including vibration, a command to the stimulation device such that an intensity of the vibration is gradually increased.

4. The information processing device according to claim 2, wherein the control unit is configured to transmit, when the stimulation device provides the user with stimulation including sound, a command to the stimulation device such that a volume of the sound is gradually increased.

5. The information processing device according to claim 1, wherein the control unit is configured to transmit, when the stimulation device starts to provide the user with stimulation before the traveling unit is coupled to the resting unit, a command to the stimulation device to stop providing the user with the stimulation after the traveling unit is coupled to the resting unit.

6. The information processing device according to claim 1, wherein the control unit is configured to transmit, when the stimulation device starts to provide the user with stimulation before the traveling unit departs for the destination after being coupled to the resting unit, a command to the stimulation device to stop providing the user with the stimulation after the traveling unit is coupled to the resting unit and departs for the destination.

7. An information processing method comprising:
acquiring, by a computer, information on a destination of a user who uses a resting unit, information on an arrival time at the destination, and information on a place in which the user uses the resting unit, wherein the resting unit comprises equipment on which the user is able to sleep inside the resting unit;
transmitting, by the computer, a command to a traveling unit configured to be coupled to the resting unit and carry the resting unit such that the traveling unit is coupled to the resting unit and arrives at the destination at the arrival time, the traveling unit being configured to be movable even while not coupled to the resting unit, wherein the traveling unit comprises a driving unit that includes a motor that drives wheels and a steering mechanism that steers the wheels; and
transmitting, by the computer, a command to a stimulation device configured to stimulate the user who is using the resting unit such that the stimulation device is activated before the traveling unit is coupled to the resting unit or before the traveling unit departs for the destination after being coupled to the resting unit, further comprising transmitting a command to the stimulation device to start to provide the user with stimulation smaller than stimulation that the user receives when the traveling unit is coupled to the resting unit or stimulation smaller than stimulation that the user receives after the traveling unit departs for the destination, before the traveling unit is coupled to the resting unit or before the traveling unit departs for the destination.

8. The information processing method according to claim 7, further comprising transmitting a command to the stimulation device such that stimulation provided to the user is gradually increased.

9. The information processing method according to claim 8, further comprising transmitting, when the stimulation device provides the user with stimulation including vibration, a command to the stimulation device such that an intensity of the vibration is gradually increased.

10. The information processing method according to claim 8, further comprising transmitting, when the stimulation device provides the user with stimulation including sound, a command to the stimulation device such that a volume of the sound is gradually increased.

11. The information processing method according to claim 7, further comprising transmitting, when the stimulation device starts to provide the user with stimulation before the traveling unit is coupled to the resting unit, a command to the stimulation device to stop providing the user with the stimulation after the traveling unit is coupled to the resting unit.

12. The information processing method according to claim 7, further comprising transmitting, when the stimulation device starts to provide the user with stimulation before the traveling unit departs for the destination after being coupled to the resting unit, a command to the stimulation device to stop providing the user with the stimulation after the traveling unit is coupled to the resting unit and departs for the destination.

13. A system comprising:
a resting unit comprising equipment on which the user is able to sleep inside the resting unit;
a traveling unit configured to be coupled to the resting unit and carry the resting unit, and to be movable even while not coupled to the resting unit, wherein the traveling unit comprises a driving unit that includes a motor that drives wheels and a steering mechanism that steers the wheels;
a terminal owned by the user; and
a control unit configured to:
acquire, from the resting unit or the terminal, information on a destination of the user who uses the resting unit, information on an arrival time at the destination, and information on a place in which the user uses the resting unit;
transmit a command to the traveling unit such that the traveling unit is coupled to the resting unit and arrives at the destination at the arrival time; and
transmit a command to a stimulation device configured to stimulate the user who is using the resting unit such that the stimulation device is activated before the traveling unit is coupled to the resting unit or before the traveling unit departs for the destination after being coupled to the resting unit, wherein the control unit is configured to transmit a command to the stimulation device to start to provide the user with stimulation smaller than stimulation that the user receives when the traveling unit is coupled to the resting unit or stimulation smaller than stimulation that the user receives after the traveling unit departs for the destination, before the traveling unit is coupled to the resting unit or before the traveling unit departs for the destination.

14. The system according to claim 13, wherein the control unit is configured to transmit a command to the stimulation device such that stimulation provided to the user is gradually increased.

15. The system according to claim 14, wherein the control unit is configured to transmit, when the stimulation device provides the user with stimulation including vibration, a command to the stimulation device such that an intensity of the vibration is gradually increased.

16. The system according to claim 14, wherein the control unit is configured to transmit, when the stimulation device provides the user with stimulation including sound, a command to the stimulation device such that a volume of the sound is gradually increased.

17. The system according to claim 13, wherein the stimulation device is provided in the resting unit or the traveling unit.

* * * * *